United States Patent
Bernhart

[15] 3,686,329
[45] Aug. 22, 1972

[54] PROCESS FOR PREPARING ORGANIC THIOLS FROM POLYSULFIDES

[72] Inventor: Donald N. Bernhart, Mt. Pleasant, Tenn.

[73] Assignee: Stauffer Chemical Company, New York, N.Y.

[22] Filed: Nov. 25, 1969

[21] Appl. No.: 879,928

[52] U.S. Cl. .......................... 260/609 R, 260/609 D
[51] Int. Cl. ............................................ C07c 149/06
[58] Field of Search ...................... 260/609 D, 609 A

[56] References Cited

UNITED STATES PATENTS

| | | | |
|---|---|---|---|
| 3,071,622 | 1/1963 | Laufer et al. | 260/609 D |
| 2,605,289 | 7/1952 | Daniels et al. | 260/609 D |
| 2,506,416 | 5/1950 | Gilbert et al. | 260/609 D |

OTHER PUBLICATIONS

Houben–Weyl, " Methoden der Organischen Chemie," Vol. 9, p. 23, (1955)

Primary Examiner—Joseph Rebold
Assistant Examiner—D. R. Phillips
Attorney—Wayne C. Jaeschke, Paul J. Juettner, Daniel S. Ortiz and Martin Goldwasser

[57] ABSTRACT

Benzene dithiol is produced by refluxing an appropriate polydisulfide in the presence of glacial acetic acid, powdered zinc and a solvent comprising a heterocyclic amine solvent having a pyridine nucleus, e.g. pyridine. The product is worked up by dissolving residual zinc in hydrochloric acid; and the organic portion is extracted with ether which is removed by distillation to leave a product containing benzene dithiol. A wide variety of organic thiols can be produced employing the heterocyclic amine solvents having a pyridine nucleus.

7 Claims, No Drawings

PROCESS FOR PREPARING ORGANIC THIOLS FROM POLYSULFIDES

This invention relates to a process for preparing organic thiols. More particularly, this invention relates to a process for preparing organic thiols by the reduction of organic polysulfides.

Although a number of reducing agents have been employed in an attempt to reduce polysulfides and particularly disulfides to thiols, these methods have not generally been successful for the reason that the sulfide linkage is either not broken or the reducing agent is so effective that it completely removes all sulfur atoms in the polysulfide bridge. With the more successful reducing agents such as zinc metal dissolved in acetic acid, the formation of thiols has generally been not more than 30 percent of theoretical. The use of various solvents, such as ethanol, has not improved the low yields.

It has now been discovered that organic polysulfides can be reduced to the corresponding thiols by the employment of a metal reducing agent, said metal having a position in the activity series higher than hydrogen, dissolved in a mineral acid having hydrogen ions, wherein said reduction is conducted in a heterocyclic amine solvent having a pyridine nucleus.

The process of the invention can be illustrated by the following reaction diagram:

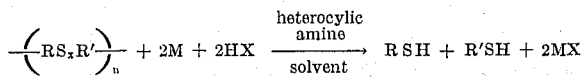

wherein R and R' are organic hydrocarbon radicals free of reactive substituents, M is a metal, X is an anion of a mineral acid, $x$ is an integer greater than 1 and less than 10, and $n$ is an integer of from 1 to 1,000.

Heterocyclic amines which can be employed in this process include pyridine, one to four carbon alkyl substituted pyridines and quinoline. Examples of suitable alkyl substituted pyridines include: 2-methyl pyridine, 4-methyl pyridine, 2,6-dimethyl pyridine, 2,4,6-trimethyl pyridine, and 2-ethyl pyridine. Preferred, however, are the unsubstituted and lower alkyl substituted amines such as pyridine and 2-methyl pyridine for the reason that they are excellent solvents for polysulfides, are commercially available in large quantities, and can be easily separated from the product by acid washing and recovered by caustic regeneration.

Mineral acids which can be employed include nitric acid, hydrochloric acid, sulfuric acid, hydrofluoric acid and acetic acid. Other mineral acids, however, can be employed, it being only necessary that the acid provide hydrogen ions and that the anion be reactive with the metal reducing agent. Preferred, however, is acetic acid for the reason that it has excellent solvent properties for organic sulfides and does not form salts with the aforesaid amines or possess any oxidative properties such as nitric acid and sulfuric acid.

Reducing metals which can be employed are those metals more reactive than hydrogen and include calcium, sodium, magnesium, aluminum, zinc, and iron. Preferred, however, is zinc for the reason that it is available in pure finely powdered form, is easy to handle and has excellent reducing properties.

The polysulfide reactant employed in the process of this invention can be represented by the formula:

$$(RS_xR)_n$$

wherein the radicals represented by R are the same or different hydrocarbon radicals of from one to 20 carbon atoms, $x$ is an integer greater than 1 and less than 10, and $n$ is an integer of from 1 to 1,000. The radicals represented by R can be aliphatic, aromatic or heterocyclic and can be substituted with any relatively inert substituent which does not interfere with the reaction. Examples of suitable substituents include the halogens such as fluorine, chlorine and bromine; and nitro and mercapto groups. The hydrocarbon radicals can also contain ether linkages. Exemplary of typical polysulfides for use in this invention is styrene polysulfide which has the repeating unit $-C_2H_3C_6H_5S_{16}-$ and is available as Thiokol polymer ZM-399. Another polysulfide in this group is one having the repeating unit $-CH_2-C_6H_4-CH_2-S_x-$ wherein $x$ is an integer of from 2 to 16.

The aliphatic polysulfides containing ether linkages are exemplified by Thiokol LP3 which has the recurring unit $-S_xCH_2CH_2OCH_2OCH_2CH_2S_x-$ wherein $x$ has a value of 4 and the polymer has a molecular weight of about 1,000. U.S. Pat. No. 2,402,977, issued July 2, 1946 to Patrick et al. describes in detail the manner of forming the organic polysulfide polymers of interest to the present invention and the ingredients involved in the formation thereof.

While the above polysulfides are illustrative of suitable polysulfides which can be employed, the particular polysulfide reactant is not a critical part of the invention, it being only necessary that the reactant have one or more polysulfide linkages.

The reaction can conveniently be conducted at atmospheric pressure within a temperature range of from about 0°C. to about 100°C. While lower and higher temperatures can be employed, it is preferred that the temperature of the reaction be maintained between about 25°C. and 50°C. in order to prevent the volatilization of solvents and lower boiling thiols and also for reasons of economy.

The reactants should be present in stoichiometric proportions but it is preferred that there be an excess of metal and mineral acid of about 50 percent to about 100 percent in order to achieve a quick reaction.

The heterocyclic amine solvent should be present in an amount sufficient to dissolve the reactants and, if desired, mixtures of amine solvents can be employed.

While the process of this invention can be used to prepare organic thiols, it is particularly advantageous in analytical work where the structure of the polysulfide is not known. Thus by reducing the polysulfide to its corresponding thiol, it is possible by conventional analytical techniques, to determine the structure of the polysulfide.

The following examples will illustrate the process of the invention and its preferred embodiments:

EXAMPLE 1

Preparation Of Benzene Dithiol

Into a 300 ml. reaction flask, fitted with a magnetic stirrer, reflux condenser and thermometer, were placed 2.8 grams of polydisulfide of the formula:

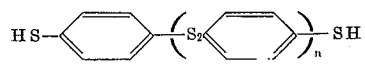

wherein $n$ is equal to 68, 150 ml. of pyridine, 12 ml. of glacial acetic acid and 6.5 grams of powdered zinc. The reaction mixture was then heated to a refluxing temperature of 118°C. and maintained at this temperature for 2 hours while vigorously agitating the mixture. The reaction was then terminated, the reaction mixture allowed to cool to room temperature and the reaction mixture was transferred to a 600 ml. beaker. To this beaker was then added slowly 15 ml. concentrated hydrochloric acid in order to dissolve the residual zinc. The organic portion was then extracted with 100 ml. of ether and washed with hydrochloric acid to regenerate the pyridine solvent. The ether was then removed by distillation at 52°C. and the residue, an amber liquid weighing 2.9 grams, was analyzed and found to constitute 2.72 grams of benzene dithiol for a yield of 96 percent.

EXAMPLE 2

Preparation Of Ethyl Benzene Thiol

Into a reaction flask was added 1 gram of styrene tetrasulfide, 50 ml. of pyridine, 5 ml. of glacial acetic acid and 2 grams of zinc dust. The flask was stoppered and agitated by means of a magnetic stirrer for 30 minutes at room temperature. The liquid contents of the flask were then transferred to a 100 ml. volumetric flask and made up to volume with methanol. The reaction mixture was then analyzed by silver nitrate analysis and the mixture was found to contain 0.792 grams of ethyl benzene thiol and 0.195 grams of hydrogen sulfide, indicating a 95 percent reduction of the tetrasulfide.

EXAMPLE 3

In accordance with the procedure of Example 2, samples of benzyl disulfide, benzyl trisulfide and benzyl tetrasulfide were reduced to benzene thiol in yields of better than 95 percent.

EXAMPLE 4

In accordance with the procedure of Example 2, ditertiary butyl and ditertiary dodecyl disulfides were reduced to their corresponding thiols in yields of better than 85 percent.

EXAMPLE 5

In accordance with the procedure of the previous examples, the examples were repeated employing 2-ethyl pyridine and 2,4,6-trimethyl pyridine as the solvent. The results were in conformance with the previous examples.

What is claimed is:

1. In a process for preparing organic thiols of the formula $R(SH)y$ wherein $y$ is an integer from 1 to 2 inclusive and R is an organic moiety of from one to 20 carbon atoms selected from the group consisting of aliphatic and aromatic hydrocarbon, aliphatic ether and aliphatic and aromatic hydrocarbon substituted with moieties selected from the group consisting of chlorine, bromine, fluorine, nitro and thiol which comprises reacting an organic polysulfide having the unit $(RS_xR)_n$ wherein the moieties represented by R can be the same or different, $x$ is an integer greater than 1 and less than 10, and $n$ is an integer of from 1 to 1,000, with a metal reducing agent in an acid having hydrogen ions the improvement which comprises: conducting said reaction in the presence of a solvent which is a heterocyclic amine having a pyridine nucleus.

2. The process of claim 1, wherein the heterocyclic amine is pyridine.

3. The process of claim 1, wherein the heterocyclic amine is 2-methyl pyridine.

4. The process of claim 1, wherein the heterocyclic amine is 2,4,6-trimethyl pyridine.

5. The process of claim 1, wherein the metal-reducing agent is zinc, the mineral acid is acetic acid and the hetero-cyclic amine is pyridine.

6. The process of claim 1, wherein the metal-reducing agent is zinc, the mineral acid is acetic acid and the heterocyclic amine is 2-methyl pyridine.

7. The process of claim 1, wherein the metal-reducing agent is zinc, the mineral acid is acetic acid and the heterocyclic amine is 2,4,6-trimethyl pyridine.

* * * * *

PO-1050
(5/69)

UNITED STATES PATENT OFFICE
CERTIFICATE OF CORRECTION

Patent No. 3,686,329      Dated August 22, 1972

Inventor(s) Donald N. Bernhart

It is certified that error appears in the above-identified patent and that said Letters Patent are hereby corrected as shown below:

Column 2, line 1, the formula " $(RS_xR)_n$ " should read -- $\{RS_xR\}_n$ --.

Column 4, line 21, Claim 1, the formula " $(RS_xR)_n$ " should read -- $\{RS_xR\}_n$ --.

Signed and sealed this 23rd day of January 1973.

(SEAL)
Attest:

EDWARD M. FLETCHER, JR.
Attesting Officer

ROBERT GOTTSCHALK
Commissioner of Patents